(12) United States Patent
Yamakawa et al.

(10) Patent No.: US 10,508,849 B2
(45) Date of Patent: Dec. 17, 2019

(54) AIR CONDITIONER WITH OUTDOOR TEMPERATURE SENSING CORRELATED TO OUTDOOR FAN CONTROL

(71) Applicant: DAIKIN INDUSTRIES, LTD., Osaka-Shi, Osaka (JP)

(72) Inventors: Takeshi Yamakawa, Osaka (JP); Kengo Murayama, Osaka (JP); Seiji Oka, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 96 days.

(21) Appl. No.: 15/906,077

(22) Filed: Feb. 27, 2018

(65) Prior Publication Data

US 2018/0245837 A1    Aug. 30, 2018

(30) Foreign Application Priority Data

Feb. 28, 2017  (JP) .................................. 2017-037706

(51) Int. Cl.
*F25B 49/02*    (2006.01)

(52) U.S. Cl.
CPC .......... *F25B 49/02* (2013.01); *F25B 2600/01* (2013.01); *F25B 2600/23* (2013.01); *F25B 2700/2106* (2013.01)

(58) Field of Classification Search
CPC .. F25B 49/02; F25B 2500/31; F25B 2611/01; F25B 2611/11; F25B 2611/23111; F25B 2700/2106
See application file for complete search history.

(56) References Cited

U.S. PATENT DOCUMENTS

| | | | | |
|---|---|---|---|---|
| 5,568,732 | A * | 10/1996 | Isshiki | F25B 13/00 62/129 |
| 2006/0075771 | A1* | 4/2006 | Tracey, Jr. | F25B 49/005 62/506 |

FOREIGN PATENT DOCUMENTS

JP    5-256528 A    10/1993

* cited by examiner

*Primary Examiner* — Jonathan Bradford
(74) *Attorney, Agent, or Firm* — Birch, Stewart, Kolasch & Birch, LLP

(57) ABSTRACT

An air conditioner of the present invention includes: a compressor; an outdoor fan; a temperature sensor configured to detect an outside temperature; a memory configured to store the outside temperature detected by the temperature sensor; and a controller configured to conduct holding control of not updating the outside temperature stored in the memory, when the compressor is being driven and the outdoor fan is stopped or is repeatedly started and stopped after the outside temperature detected by the temperature sensor is stored in the memory while the outdoor fan is being driven.

6 Claims, 3 Drawing Sheets

| MODES | | OUTSIDE TEMPERATURE |
|---|---|---|
| A | COMPRESSOR IS DRIVEN : OUTDOOR FAN IS DRIVEN | |
| | | −5°C |
| B | COMPRESSOR IS DRIVEN : OUTDOOR FAN IS REPEATEDLY STARTED AND STOPPED | |
| | | −20°C |
| C | COMPRESSOR IS DRIVEN : OUTDOOR FAN IS STOPPED | |
| | | −30°C |
| STOP | COMPRESSOR IS STOPPED : OUTDOOR FAN IS STOPPED | |

FIG.3

| MODES | | OUTSIDE TEMPERATURE |
|---|---|---|
| A | COMPRESSOR IS DRIVEN : OUTDOOR FAN IS DRIVEN | |
| | | −5°C |
| B | COMPRESSOR IS DRIVEN : OUTDOOR FAN IS REPEATEDLY STARTED AND STOPPED | |
| | | −20°C |
| C | COMPRESSOR IS DRIVEN : OUTDOOR FAN IS STOPPED | |
| | | −30°C |
| STOP | COMPRESSOR IS STOPPED : OUTDOOR FAN IS STOPPED | |

AIR CONDITIONER WITH OUTDOOR TEMPERATURE SENSING CORRELATED TO OUTDOOR FAN CONTROL

CROSS REFERENCE TO RELATED APPLICATION

This application claims priority from Japanese Patent Application No. 2017-037706 which was filed on Feb. 28, 2017, the disclosure of which is herein incorporated by reference in its entirety.

BACKGROUND OF THE INVENTION

1 Field of the Invention

The present invention relates to an air conditioner including a compressor and an outdoor fan.

2 Description of Related Art

An air conditioner recited in Japanese Unexamined Patent Publication No. H05-256528 decreases the rotation number of an outdoor fan when performing a cooling operation while the outside temperature is at about 0 degree centigrade. This prevents the compressor from being damaged.

SUMMARY OF THE INVENTION

An air conditioner may drive a compressor for further cooling even when the outside temperature is equal to or lower than −20 degrees centigrade, which is lower than temperatures at about 0 degree centigrade. When a cooling operation is performed while the outside temperature is at about 0 degree centigrade as described in the document above, even if the outdoor fan is driven, the compressor is not seized due to a differential pressure in the compressor. Meanwhile, when a cooling operation is performed while the outside temperature is equal to or lower than −20 degrees centigrade, the compressor may be seized if the outdoor fan is driven, because there is no differential pressure in the compressor and oil does not circulate in the compressor. This problem can be prevented by stopping or repeatedly starting and stopping the outdoor fan. However, when the outdoor fan is stopped or is repeatedly started and stopped, the outside air stagnates around the outdoor heat exchanger, with the result that the outside temperature cannot be accurately measured. The air conditioner is therefore disadvantageously controlled based on an inaccurate outside temperature.

An object of the present invention is to provide an air conditioner which is not controlled based on an inaccurate outside temperature when an outdoor fan is stopped or is repeatedly started and stopped.

An air conditioner of the present invention includes: a compressor; an outdoor fan; a temperature sensor configured to detect an outside temperature; a memory configured to store the outside temperature detected by the temperature sensor; and a controller configured to conduct holding control of not updating the outside temperature stored in the memory, when the compressor is being driven and the outdoor fan is stopped or is repeatedly started and stopped after the outside temperature detected by the temperature sensor is stored in the memory while the outdoor fan is being driven.

BRIEF DESCRIPTION OF THE DRAWINGS

Other and further objects, features and advantages of the invention will appear more fully from the following description taken in connection with the accompanying drawings in which:

FIG. 3 illustrates modes of a cooling operation of the air conditioner in FIG. 1.

DESCRIPTION OF THE PREFERRED EMBODIMENTS

The following describes an air conditioner of an embodiment of the present invention, with reference to the drawings.

<Overall Structure of Air Conditioner>

Figure 1:
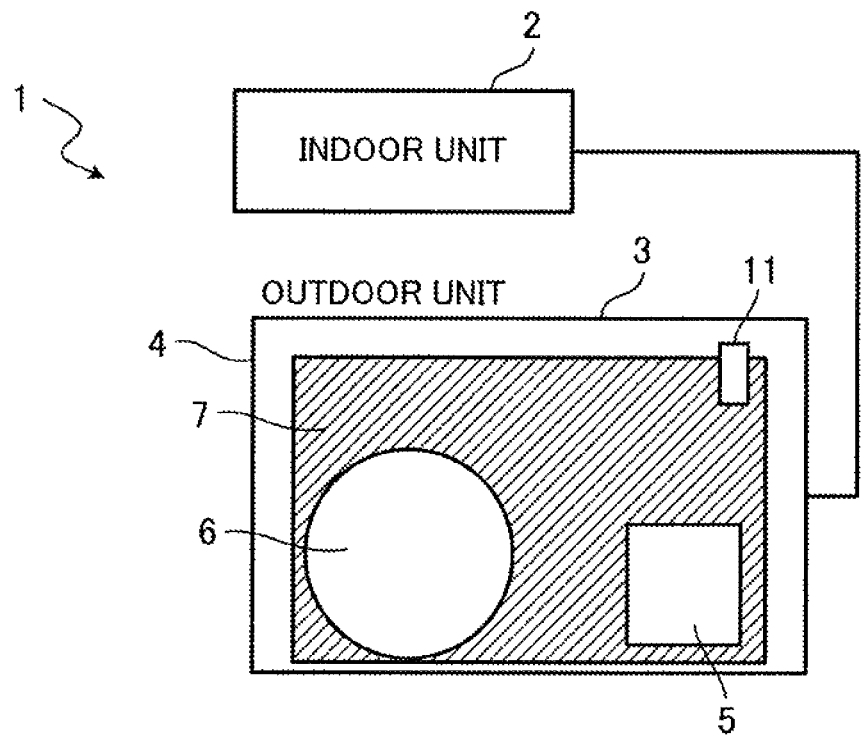
FIG. 1 shows an air conditioner of an embodiment of the present invention.

As shown in FIG. 1, an air conditioner 1 of the present embodiment includes an indoor unit 2 and an outdoor unit 3. The outdoor unit 3 includes a casing 4, a compressor 5, an outdoor fan 6, an outdoor heat exchanger 7, and a temperature sensor 11. The compressor 5, the outdoor fan 6, the outdoor heat exchanger 7, and the temperature sensor 11 are provided inside the casing 4. The temperature sensor 11 is configured to detect an outside temperature.

Figure 2:
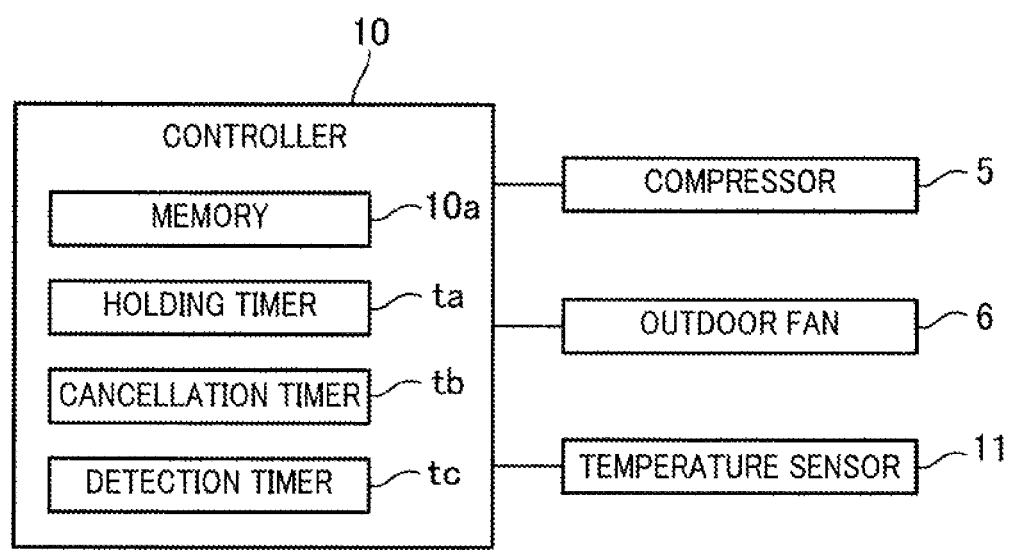
FIG. 2 shows the structure of a controller of the outdoor unit in FIG. 1.

As shown in FIG. 2, the outdoor unit 3 includes a controller 10 for controlling the air conditioner 1 (outdoor unit 3). The controller 10 includes a memory 10a configured to store an outside temperature, a holding timer ta, a cancelation timer tb, and a detection timer tc. The controller 10 is connected to the temperature sensor 11.

The memory 10a stores the outside temperature detected by the temperature sensor 11. In the air conditioner 1, when a cooling operation without holding control (hereinafter, a normal cooling operation) is being performed, the controller 10 updates the outside temperature stored in the memory 10a to the outside temperature detected by the temperature sensor 11 in realtime. The holding control herein is control that does not update the outside temperature stored in the memory 10a. Meanwhile, when the cooling operation with the holding control is being performed by the air conditioner 1, the controller 10 updates the outside temperature stored in the memory 10a to the outside temperature detected by the temperature sensor 11, each time a first predetermined time elapses from the update of the outside temperature. As such, the outside temperature stored in the memory 10a is not updated in realtime when the holding control is conducted.

The holding timer ta is configured to measure a holding time when the holding control is conducted. The holding time is a time during which the outside temperature stored in the memory 10a is held without being updated after update. When the holding time measured by the holding timer ta exceeds the first predetermined time (e.g., 60 minutes), the controller 10 drives the outdoor fan 6 and then updates the outside temperature stored in the memory 10a to the outside temperature newly detected by the temperature sensor 11. The controller 10 then continues or restarts the holding control. As such, when the holding control is being conducted in the air conditioner 1, the outside temperature stored in the memory 10a is held without being updated (i.e., the holding control is continued) until the first predetermined time elapses from the update of the outside temperature stored in the memory 10a. Each time the first predetermined time elapses from the update of the outside temperature stored in the memory 10a, the outdoor fan is driven and the outside temperature stored in the memory 10a is updated.

The cancelation timer tb is configured to measure a fan driving time when the holding control is conducted. The fan driving time is a time during which the compressor 5 and the outdoor fan 6 are kept driven. When the holding control is being conducted and the state in which the compressor 5 and the outdoor fan 6 are kept driven is continued for a second predetermined time (e.g., 15 minutes), the outside air is less likely to stagnate around the outdoor heat exchanger 7. The temperature sensor 11 therefore detects a relatively accurate outside temperature in this case. As such, when the fan driving time measured by the cancelation timer tb exceeds the second predetermined time while the holding control is being conducted, the controller 10 cancels the holding control and updates the outside temperature stored in the memory 10a in realtime. The second predetermined time is shorter than the first predetermined time.

The detection timer tc is configured to detect a detection time. The detection time is a time during which the outdoor fan 6 is driven while the compressor 5 is stopped. When the state in which the compressor 5 is stopped and the outdoor fan 6 is driven is continued for a predetermined detection time (e.g., 5 minutes), the outside air is less likely to stagnate around the outdoor heat exchanger 7. The temperature sensor 11 therefore detects a relatively accurate outside temperature in this case. As such, when the detection time measured by the detection timer tc exceeds the predetermined detection time, the air conditioner 1 stores the outside temperature detected by the temperature sensor 11 in the memory 10a.

Modes of the cooling operation in the air conditioner 1 of the present embodiment include a mode A, a mode B, a mode C, and a stop mode, as shown in FIG. 3.

The mode A is a mode in which the normal cooling operation is conducted when the outside temperature is higher than −5 degrees centigrade. In the mode A, the compressor 5 is driven and the outdoor fan 6 is also driven. Because the outdoor fan 6 is driven, the outside air does not stagnate around the outdoor heat exchanger. The holding control is therefore not conducted.

The mode B is a mode which is used when the outside temperature is equal to or lower than −5 degrees centigrade and is higher than −20 degrees centigrade. In the mode B, the compressor 5 is driven whereas the outdoor fan 6 is repeatedly started and stopped. Because the outdoor fan 6 is repeatedly started and stopped, the outside air stagnates around the outdoor heat exchanger. The holding control is therefore conducted.

The mode C is a mode which is used when the outside temperature is equal to or lower than −20 degrees centigrade and is higher than −30 degrees centigrade. In the mode C, the compressor 5 is driven whereas the outdoor fan 6 is stopped. Because the outdoor fan 6 is stopped, the outside air stagnates around the outdoor heat exchanger. The holding control is therefore conducted.

The stop mode is a mode which is used when the outside temperature is equal to or lower than −30 degrees centigrade. In the stop mode, the compressor 5 is stopped and the outdoor fan 6 is also stopped. The cooling operation is therefore not performed.

Figure 4:
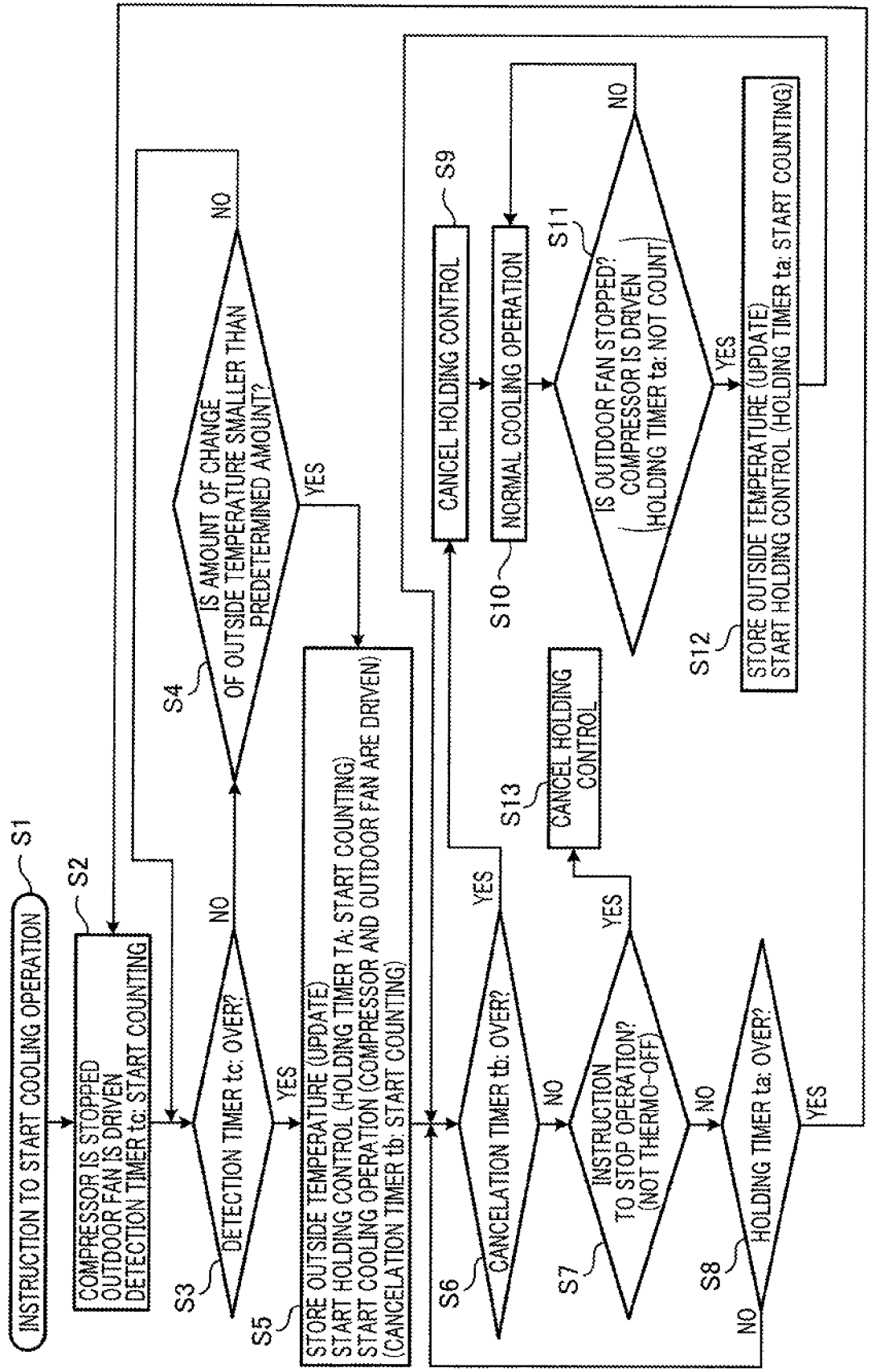
FIG. 4 illustrates how the air conditioner in FIG. 1 is controlled.

The following will describe how the air conditioner 1 is controlled by the controller 10 with reference to FIG. 4.

Upon receiving an instruction to start the cooling operation (S1), the controller 10 drives the outdoor fan 6 while the compressor 5 is stopped, and starts the measurement of the detection time by the detection timer tc (S2). The outdoor fan 6 is driven in order to prevent the outside air from stagnating around the outdoor heat exchanger 7 in order to accurately detect the outside temperature by the temperature sensor 11. The rotation number of the outdoor fan 6 is controlled to be at a predetermined rotation number.

After S2, the controller 10 determines whether the detection time measured by the detection timer tc exceeds a predetermined detection time (e.g., 5 minutes) (S3). When the detection time measured by the detection timer tc exceeds the predetermined detection time (YES in S3), the controller 10 stores the outside temperature detected by the temperature sensor 11 in the memory 10a (S5). When the memory 10a stores a previously-detected outside temperature, the controller 10 updates the outside temperature stored in the memory 10a.

When the detection time measured by the detection timer tc does not exceed the predetermined detection time (NO in S3), the controller 10 determines whether an amount of change (e.g., an amount of change per minute) of the outside temperature detected by the temperature sensor 11 is smaller than a predetermined amount of change (S4).

When the amount of change in the outside temperature is smaller than the predetermined amount of change (YES in S4), the controller 10 stores the outside temperature detected by the temperature sensor 11 in the memory 10a (S5). This is because, when an amount of change in the outside temperature is smaller than the predetermined amount of change, it is considered that the temperature sensor 11 detects a relatively accurate outside temperature. When the memory 10a stores a previously-detected outside temperature, the controller 10 updates the outside temperature stored in the memory 10a.

In S5, after storing the outside temperature in the memory 10a, the controller 10 starts the holding control and starts the measurement of the holding time by the holding timer ta. Furthermore, the controller 10 starts the cooling operation and starts the measurement of the fan driving time by the cancelation timer tb. In the present embodiment, immediately after receiving an instruction to start the cooling operation, the controller 10 stores the outside temperature detected by the temperature sensor 11 in the memory 10a and then starts the holding control and the cooling operation.

In S5, when the cooling operation starts, the compressor 5 is driven and the outdoor fan 6 is driven, too. After S5, the controller 10 determines whether the fan driving time measured by the cancelation timer tb exceeds the second predetermined time (S6).

When the fan driving time does not exceed the second predetermined time (NO in S6), the controller 10 continues the holding control without canceling the same, and determines whether an instruction to stop the cooling operation has been received (S7). A thermo-off is not regarded as the receiving of the instruction to stop the cooling operation.

When the instruction to stop the cooling operation has not been received (NO in S7), the controller 10 determines whether the holding time measured by the holding timer to exceeds the first predetermined time (e.g., 60 minutes) (S8).

When the holding time does not exceed the first predetermined time (NO in S8), the controller 10 goes back to S6.

When the holding time exceeds the first predetermined time (YES in S8), the controller 10 goes back to S2.

When the fan driving time exceeds the second predetermined time (YES in S6), the controller 10 cancels the holding control and terminates the measurement of the holding time by the holding timer ta (S9).

After S9, the controller 10 starts the normal cooling operation (S10). In the normal cooling operation, the outside temperature stored in the memory 10a is updated in realtime.

After S10, the controller 10 determines whether the outdoor fan 6 is stopped in a state in which the measurement of the holding time is not performed by the holding timer ta and the compressor 5 is driven (S11).

When the outdoor fan 6 is not stopped in the state in which the measurement of the holding time is not performed by the holding timer ta and the compressor 5 is driven (NO in S11), the controller 10 goes back to S10.

When the outdoor fan 6 is stopped in the state in which the measurement of the holding time is not performed by the holding timer ta and the compressor 5 is driven (YES in S11), the controller 10 updates the outside temperature stored in the memory 10a to the outside temperature which is detected by the temperature sensor 11 at this moment (S12).

In S12, after storing the outside temperature in the memory 10a, the controller 10 starts the holding control and starts the measurement of the holding time by the holding timer ta. After S12, the controller 10 goes back to S6.

When the instruction to stop the cooling operation has been received (YES in S7), the controller 10 cancels the holding control and terminates the measurement of the holding time by the holding timer ta (S13).

In the present embodiment, the compressor 5 is not driven while the detection timer tc measures the detection time. On this account, the compressor 5 is not driven even if a thermostat reset condition is satisfied, when the detection timer tc is measuring the detection time. In the present embodiment, the outside temperature stored in the memory 10a is not updated when the holding timer ta is measuring the holding time.

In the present embodiment, the measurement of the holding time by the holding timer to is carried out in a thermo-off state in the same manner as in states other than the thermo-off state. On this account, when it is determined that the holding time exceeds the first predetermined time in the thermo-off state, the outdoor fan 6 is driven while the compressor 5 is stopped, and the outside temperature stored in the memory 10a is updated to the outside temperature detected by the temperature sensor 11. When the air conditioner 1 is activated immediately after stop or momentary stop, the outside temperature detected by the temperature sensor 11 may not be accurate. For this reason, in the present embodiment, the driving starts in S5 after confirming as in S2 to S4 that the temperature sensor 11 detected a relatively accurate outside temperature.

<Characteristics of Air Conditioner of Present Embodiment>

When the outdoor fan 6 is stopped or is repeatedly started and stopped, the outside air stagnates around the outdoor heat exchanger 7, with the result that it is difficult to measure an accurate outside temperature by the temperature sensor 11. In such a case, in the present embodiment, the holding control of not updating the outside temperature stored in the memory 10a is performed (YES in S11 and then S12). In other words, when the outdoor fan 6 is stopped or is repeatedly started and stopped, the outside temperature detected while the outdoor fan 6 is being driven is maintained. This makes it possible to prevent an incorrect outside temperature detected by the temperature sensor 11 from being stored in the memory 10a and prevent the air conditioner 1 from being controlled based on the inaccurate outside temperature. In the air conditioner 1 of the present embodiment, an example of control based on an outside temperature is activation control of the compressor 5. In the air conditioner 1, the compressor 5 is controlled not to be activated when the outside temperature is lower than a predetermined temperature. When the temperature sensor 11 cannot detect an accurate outside temperature, the activation control of the compressor 5 cannot be adequately done. In this regard, the present embodiment makes it possible to prevent the activation control of the compressor 5 from being performed based on an inaccurate outside temperature.

In the air conditioner 1 of the present embodiment, the holding control starts when the outdoor fan 6 is stopped or is repeatedly started and stopped while the compressor 5 is being driven (YES in S11 and then S12). With this arrangement, when the outside air stagnates around the outdoor heat exchanger 7 and the temperature sensor 11 is hardly able to detect an accurate outside temperature, the holding control is performed. On this account, the prevention of control of the air conditioner 1 based on an incorrect outside temperature is further ensured.

In the air conditioner 1 of the present embodiment, the holding control is performed when the compressor 5 is being driven whereas the outdoor fan 6 is stopped or is repeatedly started and stopped (YES in S11 and then S12). Thereafter, in order to update the outside temperature stored in the memory 10a while the holding control is performed, the controller 10 stops the compressor 5 and drives the outdoor fan 6 in S2 and then updates the outside temperature stored in the memory 10a to the outside temperature newly detected by the temperature sensor 11. The air conditioner 1 is therefore controlled based on a relatively accurate outside temperature.

In the air conditioner 1 of the present embodiment, while the holding control is performed, the controller 10 updates the outside temperature stored in the memory 10a when the holding time exceeds the first predetermined time (YES in S8, . . . S5). This makes it possible to prevent the air conditioner 1 from being controlled based on an inaccurate outside temperature, which occurs when a previously-detected outside temperature is kept stored in the memory 10a.

In the air conditioner 1 of the present embodiment, the controller 10 updates the outside temperature stored in the memory 10a while the holding control is performed (S5), and then continues the holding control. This makes it possible to prevent an incorrect outside temperature detected by the temperature sensor 11 from being stored in the memory 10a and prevent the air conditioner 1 from being controlled based on the inaccurate outside temperature.

In the air conditioner 1 of the present embodiment, while the holding control is performed, the controller 10 cancels the holding control when the fan driving time exceeds the second predetermined time (YES in S6 and then S9). With this arrangement, when the outside air becomes less likely to stagnate around the outdoor heat exchanger 7 on account of the driving of the outdoor fan 6, the holding control is canceled and the outside temperature stored in the memory 10a is updated to a relatively accurate outside temperature detected by the temperature sensor 11. The air conditioner 1 is therefore controlled based on a relatively accurate outside temperature.

While in the embodiment above the outside temperature stored in the memory is updated when the holding time exceeds the first predetermined time, the disclosure is not limited to this arrangement. In the embodiment above, the holding control is canceled when the fan driving time exceeds the second predetermined time while the holding control is performed. The disclosure, however, is not limited to this arrangement. In the embodiment above, the controller updates the outside temperature stored in the memory after stopping the compressor and driving the outdoor fan. The disclosure, however, is not limited to this arrangement. The controller may update the outside temperature stored in the memory after stopping the compressor or after driving the outdoor fan.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. An air conditioner comprising:
   a compressor;
   an outdoor fan;
   a temperature sensor configured to detect an outside temperature;
   a memory configured to store the outside temperature detected by the temperature sensor; and
   a controller configured to
      control the air conditioner to operate in a plurality of operating modes based on the outside temperature detected by the temperature sensor, the plurality of operating modes including a first operating mode where both the compressor and the outdoor fan are being driven, a second operating mode where the compressor is being driven and the outdoor fan is stopped, and a third operating mode where the compressor is being driven and the outdoor fan is being repeatedly started and stopped;
      continuously update the outside temperature stored in said memory upon detection of an outdoor temperature by said temperature sensor while the air conditioner is operating in the first operating mode, and
      conduct a holding control where the outside temperature is intermittently updated, when the air conditioner is operating in the second or third operating mode.

2. The air conditioner according to claim 1, wherein, the controller starts the holding control when the operating mode is switched from the first operating mode to the second or third operating mode.

3. The air conditioner according to claim 1, wherein, while the holding control is being conducted, the controller is configured to intermittently update the outdoor temperature stored in the memory by
   1a) stopping the compressor and driving the outdoor fan,
   1b) stopping the compressor, or
   1c) driving the outdoor fan, and then
   2) updating the outside temperature stored in the memory to an outside temperature newly detected by the temperature sensor.

4. The air conditioner according to claim 3, wherein the controller again updates the outside temperature stored in the memory when a holding time during which the outside temperature stored in the memory is held without being updated exceeds a first predetermined time while the holding control is conducted.

5. The air conditioner according to claim 3, wherein, the controller updates the outside temperature stored in the memory while the holding control is conducted, and then continues the holding control.

6. The air conditioner according to claim 4, wherein the controller cancels the holding control when a fan driving time during which the compressor is driven and the outdoor fan is driven exceeds a second predetermined time which is shorter than the first predetermined time while the holding control is conducted.

* * * * *